United States Patent [19]

Nyberg et al.

[11] Patent Number: 5,969,956
[45] Date of Patent: Oct. 19, 1999

[54] METHOD AND A DEVICE FOR COMMUNICATION IN A HIGH VOLTAGE CONVERTER STATION

[75] Inventors: Krister Nyberg, Smedjebacken; Hans Björklund; Gunnar Asplund, both of Ludvika; Roland Siljeström, Grångesberg; Urban Åström, Saxdalen, all of Sweden

[73] Assignee: Asea Brown Boveri, Vasteras, Sweden

[21] Appl. No.: 09/045,896

[22] Filed: Mar. 23, 1998

[30] Foreign Application Priority Data

Jun. 11, 1997 [SE] Sweden .................................. 9702219

[51] Int. Cl.⁶ ........................................................ H02J 3/36
[52] U.S. Cl. ............................................. 363/35; 340/660
[58] Field of Search ............................ 324/765; 340/635, 340/644, 653, 660; 363/35

[56] References Cited

U.S. PATENT DOCUMENTS

| | | | |
|---|---|---|---|
| 4,377,835 | 3/1983 | Asplund et al. ........................... | 361/91 |
| 4,633,380 | 12/1986 | Kashiwazaki .............................. | 363/54 |
| 5,027,434 | 6/1991 | Brahms et al. ........................... | 455/606 |
| 5,521,526 | 5/1996 | Nyberg et al. ........................... | 324/765 |
| 5,672,917 | 9/1997 | Nakano .................................... | 307/116 |
| 5,684,465 | 11/1997 | Andersson et al. ...................... | 340/660 |

FOREIGN PATENT DOCUMENTS 195 33 968
A1 3/1996 Germany.

OTHER PUBLICATIONS

Patent Abstracts of Japan, vol. 7, No. 136 (E–181), abstract of JP 58–51749 A (Kansai Denriyoku K.K.), Mar. 26, 1983.

*Primary Examiner*—Shawn Riley
*Attorney, Agent, or Firm*—Pollock, Vande, Sande & Amernick

[57] ABSTRACT

An apparatus and method for communication between low potential level and a valve of a high voltage converter station located on high voltage potential level is provided. The apparatus comprises means adapted to send serial messages on light conductors between a valve control unit and a first control unit for controlling semiconductor components of the valve of turn-on type on high voltage potential level in periods of time when the respective light conductor is free from signals associated with a change in the conducting state of the semiconductor component, such as turn-on and/or indications signals.

21 Claims, 1 Drawing Sheet

METHOD AND A DEVICE FOR COMMUNICATION IN A HIGH VOLTAGE CONVERTER STATION

BACKGROUND OF THE INVENTION

The present invention relates to a method and a device for communication between a low potential level and a valve located at a high voltage potential level in a high voltage converter station. The valve has a plurality of valve units each having at least one semiconductor component of turn-on type and, for each semiconductor component, a first control unit located on a high voltage potential level and controlling the component. The first control units are connected to a valve control unit located on low potential level by light conductors. The light conductors carry signals associated with a change of the conducting state of the respective semiconductor component between the valve control unit and the respective first control unit, while separating them galvanically.

The above mentioned "signals associated with a change of the conducting state of the respective semiconductor component" encompasses all types of signals that may be sent between the valve control unit and the first control units in connection with a change in the conducting state of the respective semiconductor components. In the case of thyristors, this includes firing or indication signals sent in connection with turning a thyristor on, and for semiconductor components in the form of IGBT's, it is firing signals and indication signals sent in connection with turning off or short-circuiting.

Such high voltage converter stations may, for example, be stations in plants for transmitting electric power through High Voltage Direct Current (HVDC) for converting the direct voltage into alternating voltage and conversely. However, the invention is not restricted thereto, but is directed to all types of high voltage converter stations. High voltage here typically means voltages within the range of 10–500 kV. Each valve unit usually has a plurality of semiconductor components of turn-on type connected in series, such as thyristors, IGBT's or the like, which are controlled simultaneously so that they act as a single switch. The voltage to be held by the valve unit in a turned-off state of the semiconductor components is distributed among the semiconductor components connected in series, since each can normally only hold 1–5 kV.

Although it is described below that the valves have first control units, the invention also comprises the case of a directly light controlled turning-on of the semiconductor components in which the first control units then principally only conducts light pulses on the semiconductor component in question.

In the known devices in high voltage converter stations described in the introduction, two light conductors, extending between the valve control unit and the respective first control unit, are used only for communication between the electronic components on a low potential level and the individual semiconductor components, such as thyristors and IGBT's, for turning on and possibly re-turning on of thyristors and "turning on" and short circuit indication, respectively, of the IGBT's. There is no additional communication between the low potential level and the valve located on a high voltage potential level of the high voltage converter stations.

However, it is desired to extend the communication between the high voltage potential level and the low potential level in the valves, but such communication is complicated as a consequence of the high potential level on which the valve is located. The more knowledge that is available about the state of the valve, the greater will be the possibility of keeping down the high costs caused by a shut down of parts of a high voltage converter station, or the entire station during a certain period of time.

SUMMARY OF THE INVENTION

The object of the present invention is to provide a device and method of the type described in the introduction, which makes it possible to improve information exchange between the low potential level and the high voltage potential level of a high voltage converter station by a simple means.

This object, according to the invention, is obtained by providing a method and a device of the type described in the introduction. which comprises means adapted to send serial messages on the light conductors between the valve and the low potential level during periods of time in which the respective light conductor is free from signals associated with turning-on the semiconductor components.

Thus, the invention is based on the understanding that the light conductors already existing between the low potential level and the high voltage potential level of a high voltage converter station are utilized for sending serial messages therebetween in the periods of time during which no other signals such as different types of indication pulses and firing pulses, are sent on the light conductors. In this way, it is possible to easily and reliably communicate between the low potential level and the high voltage potential level with a low energy consumption, with very simple means, and at low cost.

According to a preferred embodiment of the invention, the device comprises members adapted to determine when the light conductors are free from signals associated with the change of conducting states and to provide the means with information in this regard. This ensures that no messages, or parts of messages, are sent simultaneously with the signals associated with a change in the conducting state, so that disturbances in the control of the semiconductor components may be safely avoided.

According to another preferred embodiment of the invention, the respective first control units are adapted to send an indication signal to the valve control unit on the light conductors connected thereto which states that the semiconductor component is ready for turning-on. The members are adapted to determine the point of time for sending such indication signals and to ensure the synchronizing of the sending of serial messages by the means with the sending of such indication signals by controlling the members to send the serial messages, or parts thereof, in the period of time immediately after the sending of an indication signal. By synchronizing the sending of the serial messages from the high voltage potential level to the low potential level with the indication signals in this way, it is ensured that no part of a message is sent simultaneously with an indication signal and disturbs the sending thereof. This synchronizing is important, since high voltage converter stations are usually connected to alternating voltage networks, which are asynchronous, i.e., the net frequency varies. This also results in an asynchronous turning-on of the different semiconductor components of the converter station, so that some type of coupling between the signals associated with a change of the conducting state and the signals forming the serial message is necessary for ensuring that the light conductor in question is really free for transfer of information when there is a need to send the serial message. By sending this message or parts thereof in the time period closely following the sending of an indication signal, the period of time between two consecutive indication signals may be utilized in the best possible way for sending a message or a part thereof.

According to another preferred embodiment of the invention, the means are adapted to send a serial start and stop code, respectively, on the light conductors before and after each message sent thereby in periods of time during which the light conductors are free from signals associated with a change of the conducting state of the semiconductor component. By this, the receiver of the message is given reliable information that a message is starting and the message is ending.

According to another preferred embodiment of the invention, the members are adapted to determine when the signal intended for the turning-on of the respective semiconductor component is sent from the valve control unit to the respective first control unit and to provide the means with information thereabout for synchronizing the sending of the serial message with the turn-on signal. This makes it possible to send serial messages without any mixing of the firing signal and the serial message from low potential level to high voltage potential level. By synchronizing the sending of the serial message in this direction exactly with the turn-on or firing signals and not only with the indication signals, it is ensured that a part of the message sent will not interfere with the basic function of the light conductors, i.e., the firing and the possible re-firing of the semiconductor component in question.

According to another preferred embodiment of the invention, the means are adapted to send one bit at a time on the light conductor in question in each interval between the sending of two consecutive signals associated with a change of the conducting state of the semiconductor component in question on this light conductor. By sending one bit of information at a time between two such signals, i.e., per period, maximum reliability is achieved in the sense that there is no risk of conflicting with the normal firing function of the semiconductor component. Another important advantage of sending one bit at a time is that the power consumption gets very low when sending messages. It is not a problem that the data transmission is not particularly fast, since there are no particularly high demands on response times for this type of data transmission, primarily between the different positions in the valve and the electronic components on ground.

According to another preferred embodiment of the invention, the means are adapted to send the serial messages in the form of signals of a lower level than the signals associated with the change of the conducting state of the respective semiconductor component for checking if the light margin of the latter is sufficient. By sending the message in this way, it can be determined that the light margin of the signals associated with a change of conducting states is large enough as long as the data transmission functions correctly and conversely, that the light margin is too small if there is any problem with the data transmission.

According to another preferred embodiment of the invention, the means are located in the respective first control unit and the means are adapted to receive function parameters of the valve measured on high voltage potential level and after processing thereof, to send information thereabout in the form of the serial message to a valve supervising arrangement located on low potential level. By this, the device may be utilized to improve the information on ground level about the state of the valve by receiving information directly from high voltage potential level, so that after the occurrence of different types of faults any measures required may be taken quickly, and therefore costs may be saved.

The advantages of a method according to the invention and the different embodiments thereof defined in the appended method claims appear clearly from the above discussion relating to a device according to the invention.

Additional advantages as well as advantageous features of the invention will appear from the following description and the other dependent claims.

BRIEF DESCRIPTION OF THE DRAWINGS

With reference to the appended drawing, below follows a description of preferred embodiments of the invention cited as examples.

In the drawings.

DETAILED DESCRIPTION OF PREFERRED EMBODIMENTS

Figure 1:
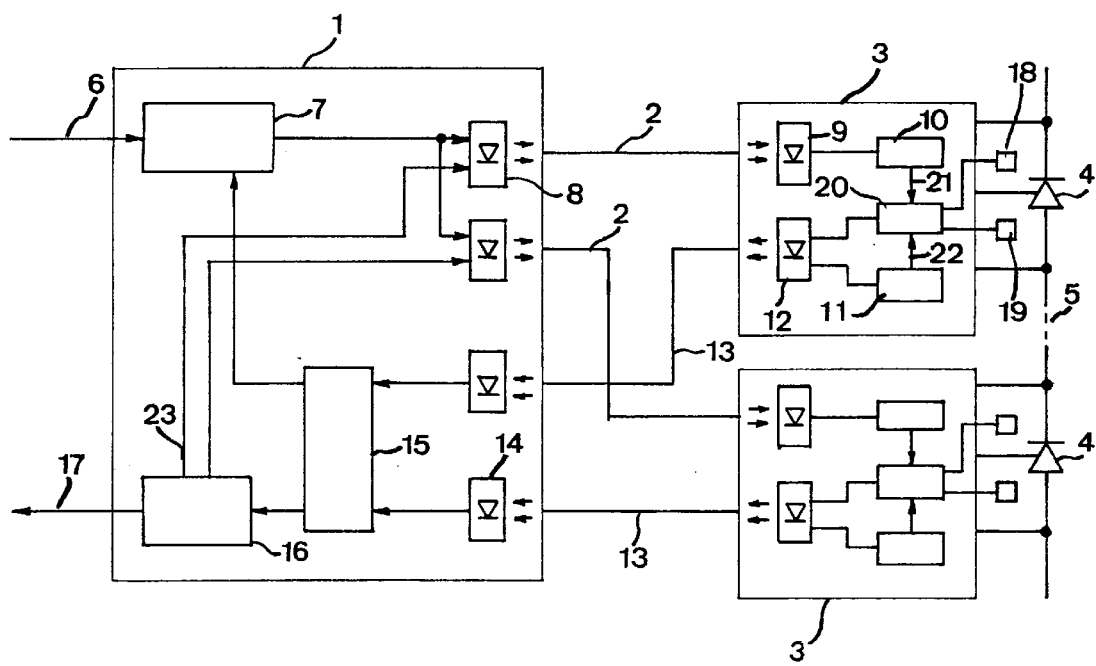
FIG. 1 is a simplified diagram illustrating a device according to a preferred embodiment of the invention.

The general construction of a valve of a high voltage converter station, for example, for converting High Voltage Direct Current (HVDC) into alternating current and conversely, and a valve control unit associated therewith are schematically illustrated in FIG. 1. The valve control unit 1 is in the converter stations adapted to communicate through light conductors 2, i.e., fiber-optic cables, with control units 3 for controlling semiconductor components 4 of turn-on type belonging to valve units, such as thyristors, in which the control only relates to firing, and IGBT's, in which the control then also relates to turn-off. A greater number of semiconductor components than is shown are usually connected in series within one single valve unit and each are controlled simultaneously through a control unit 3. This is indicated through the dashed line at 5. A valve consists of a plurality of such valve units. For simplicity in the description, assume that the semiconductor components consist of thyristors which may not be turned off, although the invention is not in any way restricted thereto.

The valve control unit 1 is located on low voltage potential level, i.e., on ground, and it receives, in a conventional way, a control pulse through an input 6 to a logic circuit 7 for normal turning-on or a firing. In turn, the logic circuitry 7 sends a firing signal FP to different light emitting diodes 8 to make the light conductors 2 send firing signals to all the control units 3 comprising part of the valve unit. The control units 3 have photo diodes 9 adapted to receive the firing signals and, through a firing circuit 10, act upon the gate of the thyristor 4 for turning-on the thyristor. The control unit 3 has, in a conventional way, a circuit 11 for sending an indication pulse IP (See FIG. 2) to light emitting diodes 12, and further through light conductors 13, to photo diodes 14 of the valve control unit so as to indicate that the voltage across the thyristor in question in the forward biasing direction thereof is sufficient for a turn-on to take place rapidly and efficiently with low power losses during the firing step.

The indication pulses continue through a logic circuit 15, the function of which will be explained further below, to the circuit 7 to control the sending of a firing pulse thereby. The valve control unit also has a logic circuit 16 for supervising the different positions of the valve and for sending the different positions of the valve from the valve control unit through a supervising bus 17.

Except for a particular arrangement of the circuits 15 and 16, the features described above are part of the prior art. The characterizing features of the invention will now be described.

Members 18, 19 adapted to detect function parameters of the valve on high voltage potential level and send values detected thereby to the thyristor control units 3 are arranged in the vicinity of each of the thyristors. Furthermore, means 20, in the form of a microcomputer consuming a weak current, is arranged in each thyristor control unit and is adapted to process the values of the function parameters detected by the members 18 and 19. Means 20 is connected with the light emitting diodes 12 so as to send information resulting from the processing through the light conductors 13. The sending of the data is synchronized with the sending of firing and/or indication pulses, which are indicated by the arrows 21, 22, and will be explained more in detail below with reference to FIG. 2. The signals coming from the light conductors 13 to the valve control unit are filtered in the logic circuit 15 to separate the indication pulses, so that the indication pulses are sent on to the circuit 7 while the data emanating from the means 20 are sent to the supervising arrangement 16 for a suitable treatment therein.

The supervising arrangement also has an output 23 connected with the light conductors 2 through the light emitting diodes 8 in order to send messages to the control units 3, such as, for example, additional firing pulses to check the function of the different thyristors.

Since the signals sent with the change of the conducting state of the thyristor on the light conductors 2, 13, i.e., firing and indication signals, are comprised of short pulses, the two light conductors between the valve control unit and each thyristor control unit are normally both under utilized. They are also comparatively difficult to utilize for another communication as a consequence of the asynchronous networks usually connected to the converter station. However, these light conductors are utilized in the present invention for sending serial messages between high voltage potential level and low potential level. This is done by using the time immediately after the sending of an indication pulse by the circuit 11 and the light emitting diode 12 towards low potential and after sending the firing pulse through the circuit 7 and the light emitting diode 8 towards the thyristors, respectively, to send serial messages between the individual positions in the valve and the electronic system on ground. The positions of the valve, the function parameters of which may be detected by the members 18 and 19, may, for example, be the temperature of the thyristor or a medium for cooling thereof, the status of voltage dividers arranged close to the thyristor, leakage of the cooling medium in a system for cooling the respective thyristor and the presence of smoke.

Figure 2:
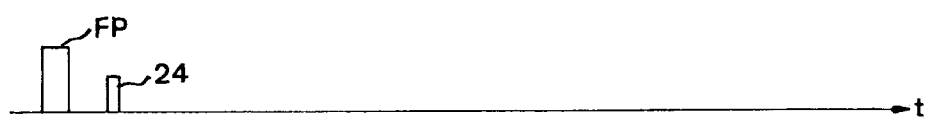
FIG. 2 is a graph illustrating how data transmission may take place in the device according to FIG. 1 for three different embodiments thereof.
Figure 2:
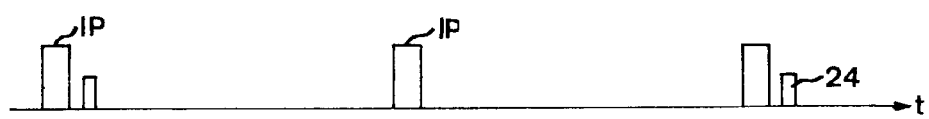
Figure 2:
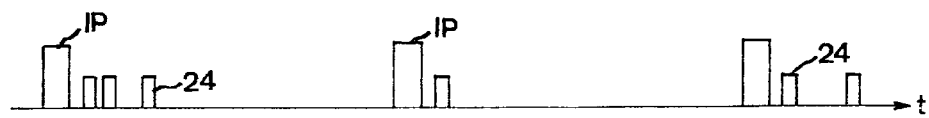

In the top graph in FIG. 2, it is illustrated how a firing pulse FP is sent on the light conductor 2 and, in the time period closely thereafter, a data bit 24, which has a lower level than the firing pulse and is eventually sent only for checking if the firing pulse has a sufficient light margin. The reception of this data bit 24 by the control unit 3 may result in the sending back of suitable data through the means 20 to the supervising arrangement 16 on low potential.

The middle graph of FIG. 2 illustrates how an indication pulse IP is sent on a light conductor 13 and, immediately thereafter, a data bit, in which during three consecutive periods the binary data bits 101 are sent. Thus, a firing pulse and an indication pulse, respectively, are each a "start pulse" for a message. It is emphasized that the graphs shown for the firing pulse and the indication pulse are not connected with each other, but the sending of the indication pulse and the firing pulse in practice, follow each other. The advantages of sending a bit of data per period have thoroughly been discussed above. The so-called one-bit system functions just as well for conventional line-commutated thyristor valves as for VSC valves with IGBT's. The difference is that there will, in conventional valves, be a bit frequency of 50–60 Hz and for VSC valves a bit frequency as high as the PWM (Pulse Width Modulation)—frequency, which, for example, may be about 2 kHz. The protocol of the one bit system is suitably constructed according to the NRZI-coding well known in field bus context, with the start and stop bit code being 01111110. To avoid confusion of the start/stop bit during data transmission, a zero is preferably put into a message when there are more than five consecutive ones.

The one-bit system has a very low power consumption and is usually sufficiently fast, but should the demands on transfer speed increase, it is of course possible to send more data bits per period, even potentially the entire message. This is offset by an increase in power consumption, more expensive fiber optic components, and the risk of conflict with the basic function of the fiber optic system, i.e., the firing and the possible re-firing of the valve. However, the fiber-optic component already in high voltage converter stations may be used for data transfer when the one bit system is used. The case of a transmission of four data bits per period synchronized with sending an indication pulse IP is illustrated in the bottom graph of FIG. 2, in which the data sent over the three periods illustrated is the following: 110110001001.

For supervising the firing channel when the valve is connected to voltage, but blocked, the method described in PCT/SE93/00662 is used for communicating with and firing a semiconductor component at the time. A complete control of the valve in the blocked and voltage connected position is obtained in this way.

The invention is of course not in any way restricted to the embodiments described above, but many possible modifications thereof will be apparent to one skilled in the art, without departing from the basic idea of the invention as defined in the claims. For example, it may be that the invention can be directly applied on semiconductor components fired by light in which messages are sent from a high voltage potential level to a low potential level. In addition to the alternatives mentioned above, the converter station on which the invention is used can be in the form of a Static Var Compensator (SVC).

What is claimed is:

1. A method for communicating between low potential level and a valve located on high voltage potential level in a high voltage converter station, said valve comprising a plurality of valve units each having at least one semiconductor component of turn-on type and for each semiconductor component a first control unit located on high voltage potential and controlling said semiconductor component, said first control units being connected to a valve control unit located on low potential level through light conductors, whereby signals associated with a change in the conducting state of the respective semiconductor components are sent between said valve control unit and said respective first control unit, while separating them galvanically, said method comprising the step of:

sending serial messages between said valve and the low potential level via said light conductor in periods of time during which the light conductor is free from said signals associated with a change in the conducting state of said semiconductor components.

2. The method of claim 1 further comprising the steps of:

detecting when said signal has been sent; and sending at least a part of said serial message thereafter and before the next said signal is sent.

3. The method of claim 1 further comprising the steps of:

sending an indication signal from said first control unit to said valve control unit indicating that said semiconductor component may be turned-on; and synchronizing the sending of said serial message on the light conductor associated with said first control unit with said indication signal.

4. The method of claim 1 further comprising the step of:

synchronizing the sending of said serial message on the light conductor associated with said first control unit with a signal for turning on said semiconductor component.

5. The method of claim 1 further comprising the step of:

sending one bit of said serial message at a time on said light conductor in the interval between two consecutive said signals associated with a change in the conducting state of said semiconductor components sent on said light conductor.

6. The method of claim 1 further comprising the step of:

checking a light margin of said signals by sending said serial message with a lower level than said signals.

7. The method of claim 1 further comprising the step of:

sending a serial start and stop code on said light conductors, respectively, before and after each said serial message in periods of time when said light conductors are free from said signals.

8. An apparatus for communicating between low potential level and a valve located on high voltage potential level in a high voltage converter station, said valve comprising a plurality of valve units each having at least one semiconductor component of turn-on type and, for each semiconductor component, a first control unit located on high voltage potential and controlling said semiconductor component, said first control units being connected to a valve control unit located on low potential level through light conductors, whereby signals associated with a change in the conducting state of the respective semiconductor components are sent between said valve control unit and said respective first control unit, while separating them galvanically, said apparatus comprising:

means for sending serial messages on said light conductors in periods of time during which said light conductors are free from said signals.

9. The apparatus of claim 8 further comprising:

second means, communicating with said first means, for determining when said light conductors are free from said signals.

10. The apparatus of claim 9 wherein said first control unit is adapted to send an indication signal on said light conductor connected thereto to said valve unit, said indication signal indicating said semiconductor component may be turned on, said second means further comprising means for determining when to send said indication signal and for controlling said first means to send at least part of said serial message shortly after sending said indication signal.

11. The apparatus of claim 8 wherein said first means further comprises:

means for sending a serial start and a serial stop code before and after each serial message, respectively, when said light conductor is free from said signals.

12. The apparatus of claim 9 wherein said second means further comprises:

means for determining when a turn-on signal is sent from said valve control to said first control unit and communicating the same to said first means.

13. The apparatus of claim 8 further comprising:

means for measuring function parameters of said valve communicating with said means;

a valve supervising arrangement located on said low potential level and communicating with said means; wherein said means processes said function parameters and sends said serial message to said valve supervising arrangement, wherein said first means is arranged in said respective control unit.

14. An apparatus according to claim 8, wherein said first means are adapted to send one bit at a time on said light conductors in each interval between the sending of two consecutive signals associated with a change of the conducting state of the semiconductor component.

15. An apparatus according to claim 7, wherein said first means are adapted to send said serial message in the form of signals having a lower level than the signals associated with the change of the conducting state of the respective semiconductor component for checking if the light margin of the latter is sufficient.

16. An apparatus according to claim 15, wherein said function parameters include at least one of the following: the temperature of the semiconductor component or of a medium for cooling thereof, the status of a voltage divider arranged at said semiconductor component, leakage of cooling medium of a system for cooling said semiconductor component and the presence of smoke.

17. An apparatus according to claim 15 further comprising a filter located on low potential level and adapted to separate said signals associated with a change of the conducting state of the respective semiconductor component from said serial messages.

18. An apparatus according to claim 8, wherein said valve is of a line-commutated type (CSC) and said semiconductor components are thyristors.

19. An apparatus according to claim 8, wherein said valve is of a forced-commutated type and part of a VSC converter.

20. An apparatus according to claim 8, wherein said converter station is for converting High Voltage Direct Current (HVDC) into alternating current and the converse.

21. An apparatus according to claim 8, wherein said converter station is in the form of a Static Var Compensator (SVC).

* * * * *